(No Model.) 4 Sheets—Sheet 1.
G. M. PELTON.
VALVE GEARING.
No. 331,436. Patented Dec. 1, 1885.
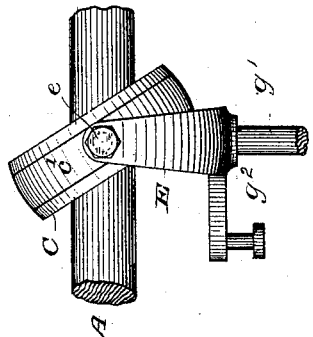
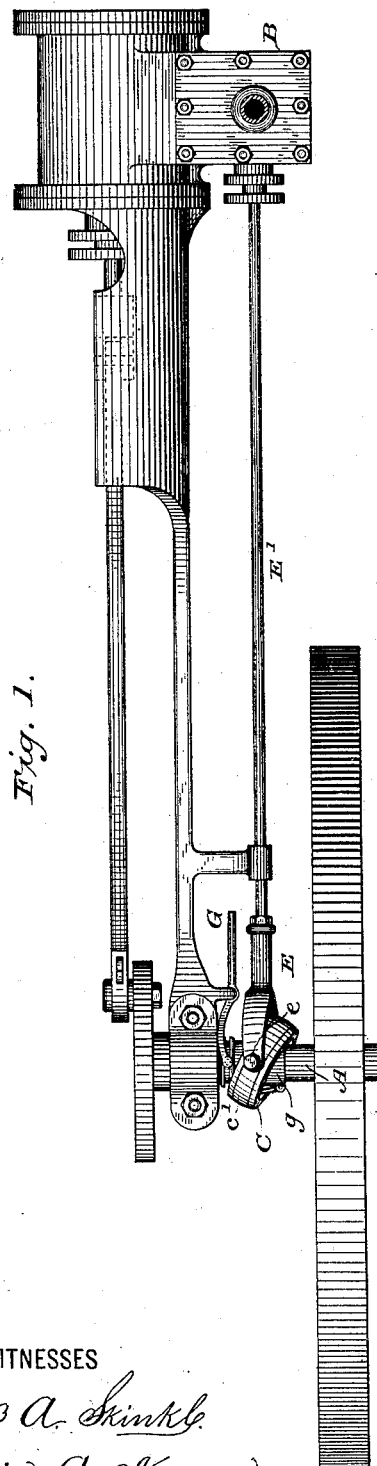
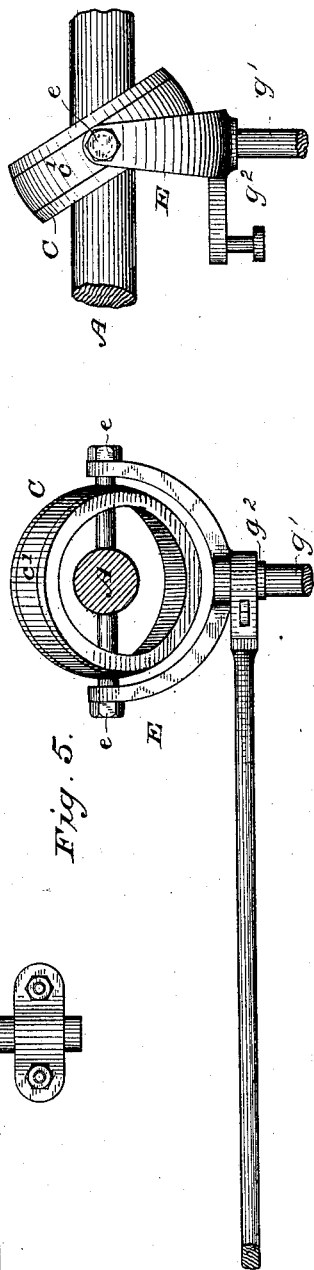
WITNESSES
Wm A. Skinkle
Edwin A. Newman
INVENTOR
George M. Pelton
By his Attorneys (No Model.) 4 Sheets—Sheet 2.
G. M. PELTON.
VALVE GEARING.
No. 331,436. Patented Dec. 1, 1885.
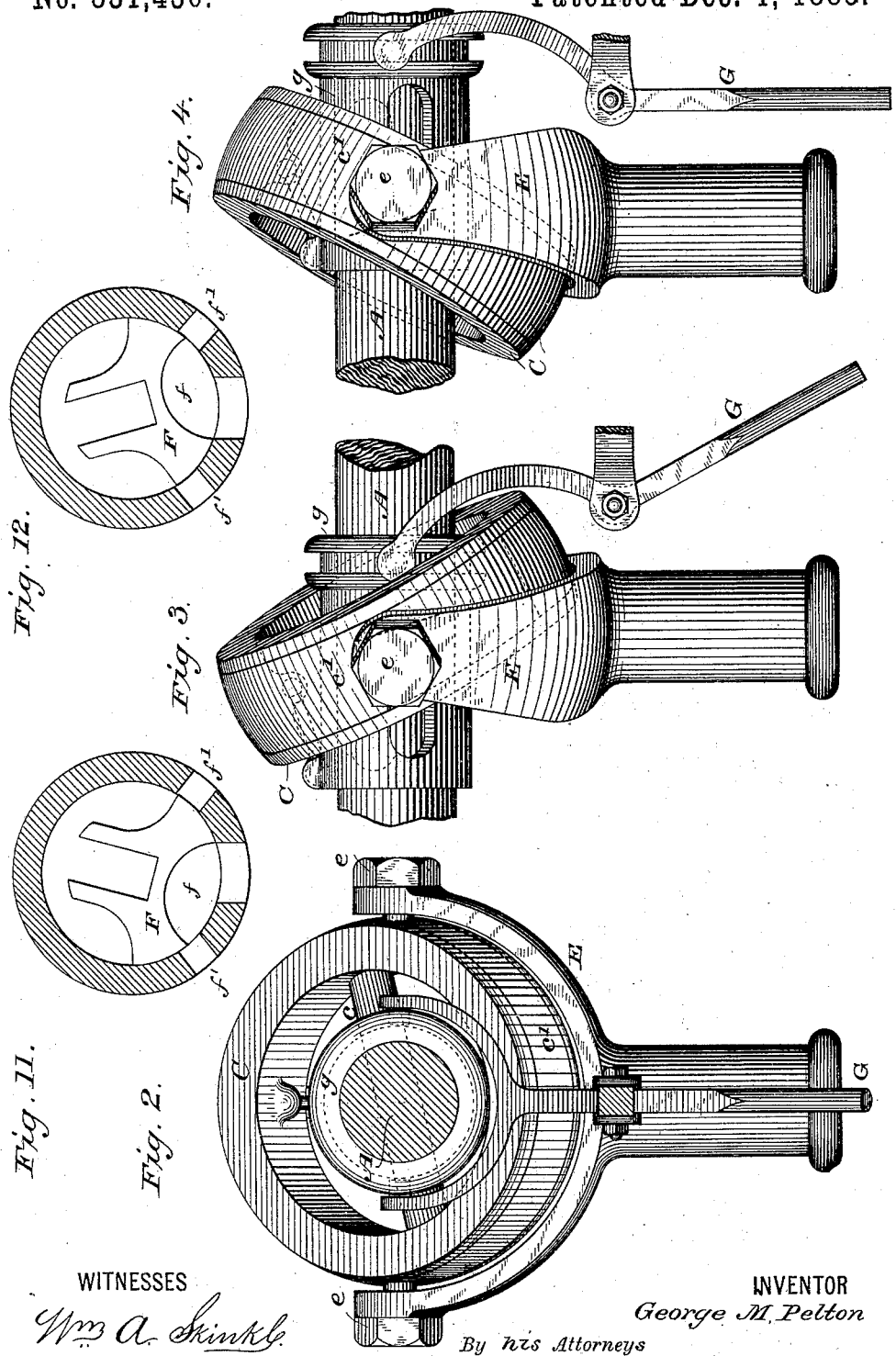
WITNESSES
Wm A. Skinkle
Edwin A. Newman
INVENTOR
George M. Pelton
By his Attorneys (No Model.) 4 Sheets—Sheet 3.

G. M. PELTON.
VALVE GEARING.

No. 331,436. Patented Dec. 1, 1885.

WITNESSES
Wm A. Skinkle
Edwin A. Newman

INVENTOR
George M. Pelton
By his Attorneys
Pancurson & Pancurson (No Model.) 4 Sheets—Sheet 4.

G. M. PELTON.
VALVE GEARING.

No. 331,436. Patented Dec. 1, 1885.

Witnesses
Geo. W. Young.
Henry A. Lamb.

Inventor
George M. Pelton.
By his Attorneys
Parkinson & Parkinson

UNITED STATES PATENT OFFICE.

GEORGE M. PELTON, OF BELMONT, NEW YORK.

VALVE-GEARING.

SPECIFICATION forming part of Letters Patent No. 331,436, dated December 1, 1885.

Application filed March 2, 1883. Serial No. 86,813. (No model.)

*To all whom it may concern:*

Be it known that I, GEORGE M. PELTON, of Belmont, in the county of Allegany and State of New York, have invented certain new and useful Improvements in Valve-Gearing for Steam-Engines, of which the following is a specification.

My invention relates to that class of valve-gearing in which the motion of the valve is controlled by an oblique disk upon one of the revolving shafts of the engine. Such disk has been heretofore pivoted to its shaft by a diametrical pin passing through said shaft at right angles to its length, and means have been provided whereby the angle between the disk and shaft could be varied by moving the disk upon its pivot-pin, the intention being either to change the throw of the valve or to reverse the engine. With the pin placed as stated, however, at right angles to the length of the shaft, difficulty will be experienced in reversing, owing to the fact that the lead or lap of the valve will not be taken out. To obviate this difficulty I pass the pin through the shaft at an oblique angle, still retaining it in diametrical relation to the disk, and have found the purpose to be fully accomplished thereby. In valve-gearing of this type, also, so far as I am aware, there has prior hereto been no method of regulating the motion of the engine by automatically governing and changing the throw of the cut-off. I propose to pivot a second grooved disk to the revolving shaft and connect it with a cut-off valve sliding over ports in the main valve. Upon or connected with this second wheel or disk is a governor, whereby its angle of inclination to the shaft will be varied as the speed of said shaft tends to increase or diminish under varying load, thus by increasing or diminishing the throw of the valve, cutting off quicker or later the stroke, as may be required. These two improvements and the details and modifications arising therefrom constitute my invention.

Figure 8:
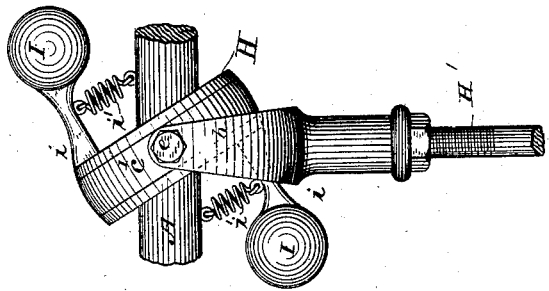
Figure 7:
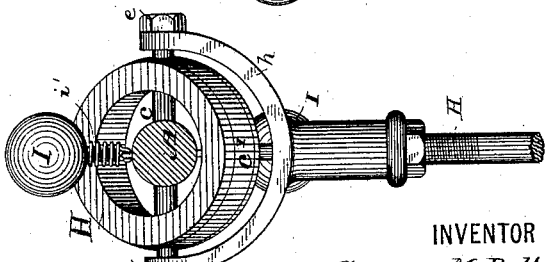
Figure 13:
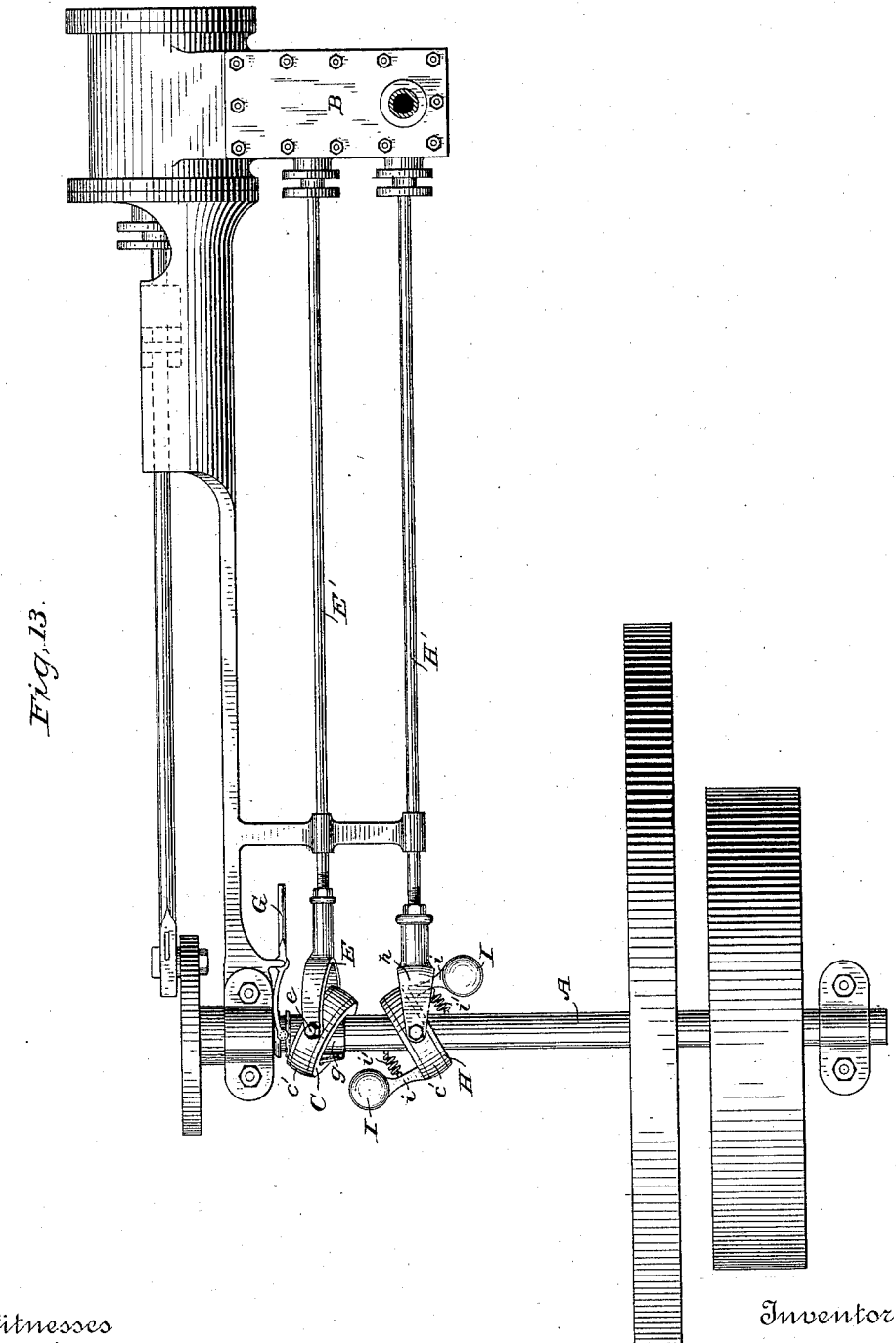

In the drawings, Figure 1 is a plan view of so much of a steam-engine embodying my improvements as is necessary to a complete understanding thereof; Figs. 2, 3, and 4, details of the disk controlling the main valve; Figs. 5 and 6, a modification designed to control a sliding valve; Figs. 7 and 8, details of one form of governor for the disk controlling the cut-off valve, and Figs. 9 and 10 details of a second form of such governor; Figs. 11 and 12, details of an oscillating valve illustrating the operation of the mechanism shown in Figs. 3 and 4, and for that purpose in different stages of movement; and Fig. 13, a plan view of an engine with the herein-described mechanism for controlling both the main and the cut-off valve.

A is a revolving shaft, usually the main shaft of the engine; and B, the steam-chest. Upon the shaft is mounted the disk C, pivotally secured thereto by an oblique pin, $c$, which, however, is within the plane of or in diametrical relation to said disk, and having a circumferential groove, which receives a strap or collar, $c'$. Diametrically opposite each other upon this strap are pins $e$, which receive the arms of a yoke, E, from the end of a rod, E', hereinafter termed the "main-valve rod," journaled in bearings in the frame and carrying at its other end an oscillating valve, F, acting upon suitable steam-ports, $f f'$, as the rod is oscillated by the revolution of the disk. Upon the revolving shaft is a sliding collar, $g$, turning therewith, and connected by a link with the side of the pivoted disk between the pivotal points. A lever, G, is so placed as to move this collar and set it as may be desired to change the angle between the disk and the shaft, so as to increase or diminish the oscillation of the valve-rod, and consequently the throw of the valve, or else, by reversing the angle between the disk and the shaft, to reverse the valve and the engine. Should, however, a slide-valve instead of an oscillating valve be used, the end of the valve-rod, instead of bearing such oscillating valve may be furnished with a crank and wrist-pin connected by a pitman with such slide-valve; or the construction indicated in Figs. 5 and 6 may be adopted—that is, the yoke may be furnished with a short stub, $g$, corresponding to a short length of the valve-rod, the end of this stub being journaled in a bracket or any convenient part of the frame-work, and between said journal and the yoke provided with a crank-arm and wrist-pin, $g^2$, from which a pitman or regular valve-rod will pass to the sliding valve.

H is the disk, controlling the cut-off valve by means of a strap, $c'$, yoke $h$, and rod $h'$, similar to the foregoing. This disk may be pivoted to the shaft either by an inclined pivot or one directly at right angles with the length of the shaft. Under such arrangement, owing to the fact that when the movement of the cut-off is regulated by the disk, the points of pivot of the valve-rod yoke upon the strap are exactly in line with the points of pivot of the disk itself twice in every revolution of the latter, and at such moments the governor, whatever that may be, is relieved of the weight and friction of the valve-rod while changing the inclination of the disk to indicate the point of cut off. In other words, the governor, being entirely relieved of actuation twice in each revolution, is more sensitive for the purpose of indication. Various forms of governor may be used with this latter disk. One of the simplest is suggested in Figs. 7 and 8. Arms $i$ project laterally from the disk, one on each side, diametrically opposite each other, and on that diameter crossing the pivot at right angles. At the ends of these arms are balls or weights I, held in toward the shaft by means of springs $i'$, keeping the disk normally in a slightly oblique position sufficient for the ordinary actuation of the cut-off valve. With an increase of speed in the shaft the centrifugal force will overcome the stress of the springs and carry the balls out, changing the inclination of the disk to the shaft and decreasing the throw of the cut-off valve, while, as the shaft slows down, the springs will overcome the centrifugal force and draw the balls in again, bringing the disk more nearly to right angles with said shaft, and thereby increasing the throw of the valve.

Figure 10:
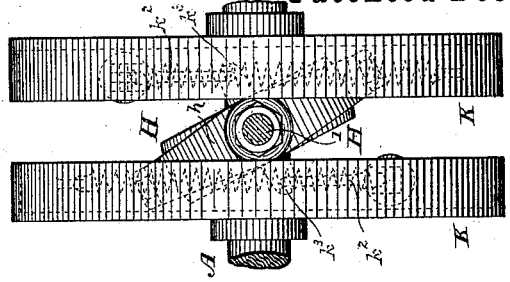
Figure 9:
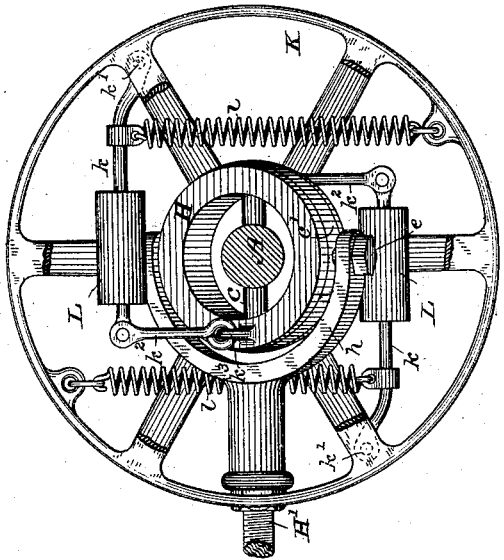

Another form of governor is represented in Figs. 9 and 10. Two light rims, K, are attached to the shaft, one on each side of the disk. To one of the arms or spokes of each rim is secured a rod or bar, $k$, by means of a pivot-pin, $k'$. The other end of each rod is secured by an intermediate link, $k^2$, to a lateral projection, $k^3$, from the disk corresponding to the lateral projection in the governing arrangement above described and upon the same side as the rod to which it is connected. An adjustable weight, L, is mounted upon the rod, and a coiled spring, $l$, is attached at one end to said rod and at the other to the rim or to an arm thereof. The weight and spring act as counterbalancing forces. Thus as the motion of the shaft increases the centrifugal force of the weight, acting through the links or connecting-arms, increases the inclination of the disk to the shaft and causes the valve to cut off the steam earlier in the stroke, and, vice versa, if the motion tends to decrease, the tension force of the spring causes the disk to approach nearer a right angle to the shaft, and the steam is cut off later in the stroke. It is of course necessary, when the main valve oscillates, that the cut-off valve shall be operated from its oscillating rod or shaft by an intermediate pitman. Said cut-off valve will therefore be furnished with a crank and the end of a valve-rod with a corresponding crank, the two being connected by a short link or pitman. The main valve is a sliding one, operated by means of a crank on its own valve-rod, as hereinbefore suggested. The cut-off valve will be similarly operated, and the arrangement of the two valves and their rods will not differ materially from the slide-valves heretofore used.

I claim as my invention—

1. The combination, substantially as hereinbefore set forth, to form a valve-gear, of a disk pivoted to the shaft upon an axis oblique to said shaft but diametrical of the disk, means for swinging said disk upon its axis, a strap laid in a peripheral groove of said disk, and a valve rod or shaft pivoted to said strap at points diametrically opposite each other.

2. The combination, substantially as hereinbefore set forth, of a disk pivoted to a revolving shaft by an oblique pivot-pin diametrical of said disk, means for swinging said disk upon its axis, a strap laid in a peripheral groove in said disk, an oscillating rod journaled in the frame-work and connected to said strap by a yoke and pivot-pins, and a valve operated by the oscillation of such rod.

3. The combination, substantially as hereinbefore set forth, to form a cut-off valve governor, of a disk pivoted to a revolving shaft, a strap laid in a peripheral groove in said disk, an oscillating rod connected with said cut-off, and by a yoke and pivot-pins with the strap, and means whereby the disk is caused automatically to vary its angle with the shaft as the speed of the latter increases or diminishes.

4. The combination, substantially as hereinbefore set forth, of a disk pivoted to a revolving shaft, a strap laid in a peripheral groove in said disk, an oscillating rod connected by a yoke and pivot-pins with said strap, and also connected with the cut-off valve, to control it by its oscillation, and a governor connected with the disk, to automatically change its angle with the shaft as the speed of the latter varies, to increase or diminish the oscillation of the rod and the throw of the cut-off valve.

5. The combination, substantially as hereinbefore set forth, of a disk pivoted to a revolving shaft, a strap laid in a peripheral groove in said disk, an oscillating rod connected with said strap by a yoke and pivot-pins, a cut-off valve connected with said rod, springs tending to hold the disk in a normal slightly-oblique position upon the shaft, and weights connected with each side of the disk in such manner that the centrifugal force will tend to increase its inclination to the shaft.

6. The combination, substantially as hereinbefore set forth, of the disk pivoted to a revolving shaft, the strap laid in a peripheral groove therein, the oscillating rod connected to said strap by a yoke and pivot-pins, the cut-off valve connected with said rod, the two rims fixed to the shaft, one on each side of the disk, the rods or arms pivoted to said rims, and link connected with lateral arms from the disk, the adjustable weights on said rods, and the springs connecting the rods with the rims.

7. The combination, substantially as heretofore set forth, of a disk pivoted to the revolving shaft and arranged to be set at different degrees of inclination thereto, a valve-rod and main valve operated by said disk, a second disk pivoted to the shaft and supplied with a governor, and a valve-rod and cut-off valve operated by said latter disk.

GEORGE M. PELTON.

Witnesses:
W. P. CLARK,
J. H. BRANSON.